(12) United States Patent
Pacholok

(10) Patent No.: US 10,932,328 B2
(45) Date of Patent: Feb. 23, 2021

(54) HAND HELD AIR COOLED INDUCTION HEATING TOOLS WITH IMPROVED COMMUTATION

(71) Applicant: David R. Pacholok, Sleepy Hollow, IL (US)

(72) Inventor: David R. Pacholok, Sleepy Hollow, IL (US)

(73) Assignee: David R. Pacholok, Sleepy Hollow, IL (US)

( * ) Notice: Subject to any disclaimer, the term of this patent is extended or adjusted under 35 U.S.C. 154(b) by 230 days.

(21) Appl. No.: 16/112,748

(22) Filed: Aug. 26, 2018

(65) Prior Publication Data
US 2020/0068666 A1 Feb. 27, 2020

(51) Int. Cl.
*H05B 6/10* (2006.01)
*H05B 6/14* (2006.01)
*B23K 13/01* (2006.01)
*B23K 1/002* (2006.01)

(52) U.S. Cl.
CPC ............ *H05B 6/101* (2013.01); *B23K 13/01* (2013.01); *H05B 6/14* (2013.01); *B23K 1/002* (2013.01)

(58) Field of Classification Search
CPC .......... B23K 13/01; B23K 1/002; H05B 6/04; H05B 6/06; H05B 6/101; H05B 6/14
See application file for complete search history.

(56) References Cited

U.S. PATENT DOCUMENTS

| | | | | |
|---|---|---|---|---|
| 2,333,593 A * | 11/1943 | Slepian | .................... | H05B 6/04 363/122 |
| 3,775,577 A * | 11/1973 | Peters, Jr. | .............. | H02H 7/122 219/626 |
| 3,876,924 A * | 4/1975 | Peters, Jr. | ........... | H02M 7/5157 363/124 |
| 5,122,947 A * | 6/1992 | Hishiki | ................. | H01F 27/346 363/61 |
| 5,764,500 A * | 6/1998 | Matos | ..................... | H02M 7/48 323/331 |
| 6,124,581 A * | 9/2000 | Ulrich | ..................... | H05B 6/08 219/626 |
| 6,316,755 B1 * | 11/2001 | Ulrich | ..................... | H05B 6/06 219/660 |
| 6,683,286 B2 * | 1/2004 | Ulrich | ..................... | H05B 6/06 219/661 |

(Continued)

Primary Examiner — Ibrahime A Abraham
Assistant Examiner — Frederick F Calvetti
(74) Attorney, Agent, or Firm — Karjane McManus; Jeanette M. Braun; Braun IP Law, LLC

(57) ABSTRACT

The hand-held induction air-cooled induction heater used for heating of metallic mechanical or decorative objects to facilitate their removal or installation contains a high frequency inverter operating in voltage or current resonant mode, including power semiconductor switching device(s) having turn-on or turn-off delay time, circuitry to control the timing of on and off periods of said switching device(s), the circuitry having delay time, wherein the threshold voltage or current reference to initiate commutation or timing is not zero, and is dynamically varied in response to the instantaneous input inverter supply voltage and/or inverter frequency to achieve switching device(s) heating or dissipation reduction resulting from improved commutation timing of said power switching devices.

12 Claims, 3 Drawing Sheets

(56) References Cited

U.S. PATENT DOCUMENTS

| | | | | |
|---|---|---|---|---|
| 8,890,042 B2* | 11/2014 | Uchida | ............... | H05B 6/101 |
| | | | | 219/672 |
| 9,247,589 B2* | 1/2016 | Uchida | ............... | H05B 6/06 |
| 9,318,884 B2* | 4/2016 | Ulrich | ............... | H02G 1/128 |
| 9,751,108 B2* | 9/2017 | Shih | ............... | B06B 1/0292 |
| 2002/0036200 A1* | 3/2002 | Ulrich | ............... | H05B 6/06 |
| | | | | 219/665 |
| 2002/0060218 A1* | 5/2002 | Ulrich | ............... | H05B 6/06 |
| | | | | 219/665 |
| 2005/0199614 A1* | 9/2005 | Uchida | ............... | H05B 6/067 |
| | | | | 219/662 |
| 2011/0139771 A1* | 6/2011 | Dohmeier | ............... | H05B 6/04 |
| | | | | 219/661 |
| 2012/0248093 A1* | 10/2012 | Ulrich | ............... | H05B 6/14 |
| | | | | 219/600 |
| 2013/0248520 A1* | 9/2013 | Uchida | ............... | H05B 6/08 |
| | | | | 219/662 |
| 2014/0008356 A1* | 1/2014 | Uchida | ............... | H05B 6/06 |
| | | | | 219/672 |
| 2017/0238374 A1* | 8/2017 | Pacholok | ............... | H01F 3/10 |
| | | | | 219/670 |

* cited by examiner

HAND HELD AIR COOLED INDUCTION HEATING TOOLS WITH IMPROVED COMMUTATION

BACKGROUND

Field of the Invention

This invention relates to the field of hand held, air cooled, induction heating tools such as used in automotive repair, industrial repair, marine repair, for heating rusted nuts and bolts to enable their removal and for general rapid heating of small metallic objects for a variety of purposes wherein commutation has been improved to provide a significant increase of wattage and thus heating to the tool.

Prior Art

Heretofore such heating tools have been limited to a power of about 1000 watts. It would be very desirable to increase the power of such induction heating tools to 1500 or even 2000 or more watts without substantially increasing the size or weight of such a tool. Such an improved tool would be able to heat a given metallic object twice as fast and/or to a much higher temperature. A substantially larger metallic object may also be heated to a desired temperature by benefit of greatly increased heating power available to a work coil of the tool.

It has been experimentally found that in order to roughly double the heating power in the same size and weight induction heating tool, several improvements are needed. Improvements needed to a high frequency step down transformer of the tool have been disclosed in various pieces of prior art. A major additional improvement needed is to reduce the heat dissipation in the high frequency power switching devices, typically IGBTs or MOSFETS or SiC MOSFETS. Reducing the dissipation allows the use of the same size heat sink or other heat dissipating means thus obviating the need to increase the dimensions of the hand-held case, a highly desirable result. An additional improvement, as is well known in the high frequency switching power supply industry, is raising the operating frequency which allows the use of physically smaller components such as transformers, inductors, and capacitors.

Two basic resonant power circuits are commonly employed in hand held air cooled Induction heating tools. These are the series resonant and the parallel resonant converters or inverters. As the name implies the series resonant makes use of a capacitor(s) in series with an inductive device such as a transformer, inductor, work coil, or some combination thereof. The parallel resonant circuit makes use of the same components but with the capacitive and inductive elements in a generally parallel electrical configuration. Other circuit configurations are possible by combining series and parallel circuits, but present current and voltage load waveforms to the one or more high frequency power semiconductor switching devices that are similar to either a series or a parallel configuration. Combined, the power semiconductor switches, the inductive and capacitive elements, and gate drive/control circuitry form a high frequency power supply or inverter suitable for induction heating.

In the case of a series resonant power circuit, lowest power switch dissipation results when the turn on and turn off times of the power semiconductors exactly coincide with the natural Current Zero times in the L-C or Tank circuit current sine wave. This is termed Zero Current Switching or ZIS. Conversely, in a parallel resonant power circuit, the lowest dissipation results when the turn on and turn off times of the one or more semiconductor switches exactly coincide with the tank circuit voltage sine wave zero. This is termed ZVS. A zero or near-zero current or voltage detector is commonly used to tell the control circuitry that determines power switch timing when the zero crossing has occurred or is about to occur. These switching times are called commutation.

It has long been understood that power semiconductors need a finite time to switch from the off to on state or on to off state. Similarly, it is well known that gate driver ICs have a finite propagation time, and small signal bipolar or FET transistors requiring a finite time to turn on or off.

SUMMARY OF THE INVENTION

According to the invention there is provided a hand-held induction air-cooled induction heater used for heating of metallic mechanical or decorative objects to facilitate their removal or installation containing a high frequency inverter operating in voltage or current resonant mode, including power semiconductor switching device(s) having turn-on or turn-off delay time, circuitry to control the timing of on and off periods of said switching device(s), said circuitry having delay time, wherein the threshold voltage or current reference to initiate commutation or timing is not zero, and is dynamically varied in response to the instantaneous input inverter supply voltage and/or inverter frequency to achieve switching device(s) heating or dissipation reduction resulting from improved commutation timing of said power switching devices.

DESCRIPTION OF THE PREFERRED EMBODIMENTS

Figure 1:
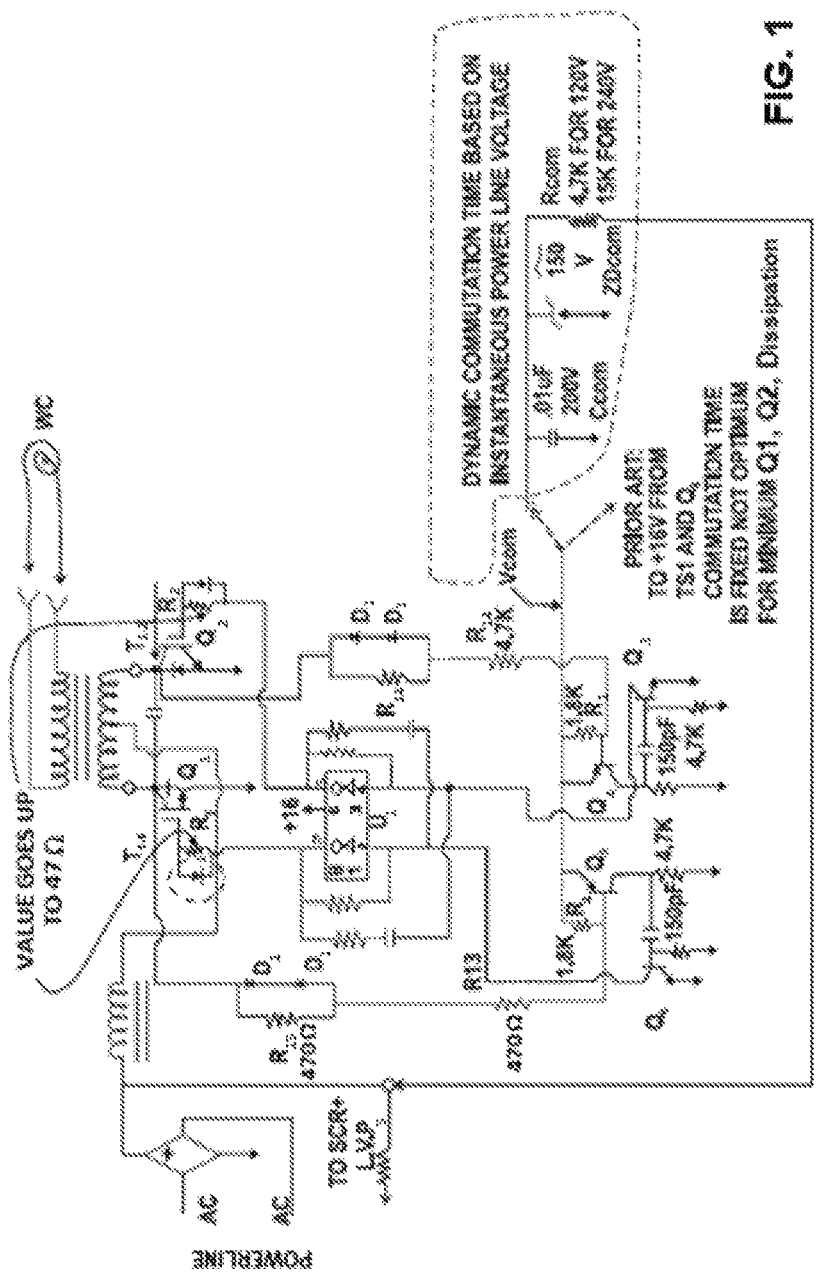
FIG. 1 is a schematic representation of one embodiment of the parallel resonant inverter of the present disclosure.

Referring to FIG. 1 there is disclosed therein a known schematic of a prior art parallel resonant inverter that uses near-zero voltage detection to determine commutation, which will be understood easily by those skilled in the art. Referring to the schematic, PNP bipolar transistors Q3 and Q4 control the commutation of power semiconductors Q1 and Q2 by way of Q6, Q7 and U1. The emitters of Q3 and Q4 are at a fixed reference voltage, about 16 volts DC. In order for commutation to occur wherein Q1 is turned on and Q2 is turned off while Q3 is in this prior art turned on at a point near the natural zero of the half-sine voltage on the collector of Q1. Q3 requires 0.6 volts for it to turn on. R9 and R13 form a 3.6:1 voltage divider, and D5 and D6 each have a forward voltage of about 0.6 volts. Therefore the voltage on Q1 collector must drop to 16−3.6×0.6−2×1.2=12.6 volts before Q3 signals the remaining circuitry for commutation. This commutation reference voltage is fixed in the prior art and will be shown to be non-optimum in terms of power semiconductor dissipation. Poor commutation and severe mistiming of Q1 and Q2 conduction occurs, resulting in dissipation far greater than the minimum possible, disallowing power greater than about 1000 watts in the prior art.

It is possible to calculate the switching times and delays in the prior art circuit of FIG. 1. According to manufacturer data sheets, Q3, an MMBT4403, has a turn on delay time of 15 nSec and a rise time of 20 nSec. Q5, an MMBT 3904, has rise and delay times of 35 nSec each. The inverting gate driver IC has a propagation delay time of 35 nSec. It also has a rise and fall time of 31 nSec driving a 2.5 nF capacitive load. Q1 AND Q2, type IKW40N120H3, present a 2.33 nF capacitive load to the MC33151. These IGBTs have a Tdelay on of 30 nSec, a Trise of 57 nSec, a Tdelay off of 290 nSec and a Tfall of 16 nSec.

Adding the delays between Q1 collector falling to 12.6 volts and the turn on of Q1 we have:

15+20+35+35+35+31+30+57=258 nSec total.

Adding the delays between Q1 collector falling to 12.6 volts and the turn off of Q2 we have:

15+20+35+35+35+31+290+16=477 nSec total.

It is possible to compare these delay figures with ideal commutation, and the commutation achieved using the exemplary prior art circuit at a particular inverter DC voltage input and operating frequency. It will be recognized by those skilled in the art of hand held, air cooled induction heating tools that the DC operating voltage of such is not fixed but rises and falls with the rectified but unfiltered Haversine voltage produced by the 50 or 60 Hz power line. This is done to eliminate bulky and expensive electrolytic filter capacitors and to provide a high power factor and low power line harmonics as required by government regulatory standards, such as IEC61000-3-2. As such, the input voltage to the IH inverter rises from zero to SQRT 2×RMS input power line voltage during the 0 to 90 degree portion of a power line cycle, and falls back toward zero between 90 and 0 degrees. For a 120 VAC rated IH inverter 0 to 170 VDC will be cyclically provided at twice the line frequency of 60 Hz. For a 240 VAC IH inverter 0 to 340 VDC will be cyclically provided at twice the line frequency of 50 Hz.

Figure 1B:
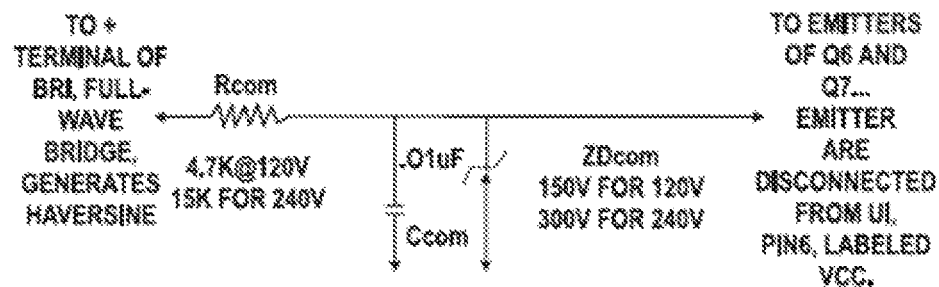
FIG. 1B is a schematic representation of one embodiment of the commutation subcircuit of the present disclosure.

In FIG. 1, a first example or embodiment of commutation filter 100 as more simply visualized in FIG. 1B, is provided at 340 VDC and 50 KHz inverter frequency. The period of 50 KHz is 20 uSec, which represents 360 degrees or 0.055 uSec/degree or 55 nSec/degree. For the exemplary prior art circuit, the peak voltage at Q1 or Q2 collector is Pi×Vin or 340×3.14=1068 volts. To control the commutation time Q3 switches on when Q1 collector voltage drops to 12.6 volts in this circuit with an ArcSin(12.6/1068)=0.68 degrees or 179.32 degrees. This represents 55 nSec×0.68=37.4 nSec before the actual VQ1 zero crossing when Q3 is signaled that commutation is desired. Since the total delay for Q1 turn on is 258 nSec, the commutation of Q1 is 258−37.4=220.6 nSec late. The Q2 turn off commutation is 477−37.4=439.6 nSec late. This late commutation substantially increases the power dissipation in Q1 and Q2. During the time that both Q1 and Q2 are both conducting in forward or reverse direction (through their internal anti-parallel diodes) the high resonant current in the transformer primary is essentially short circuited.

It would be desirable to raise the commutation reference voltage at the emitters of Q3 and Q4 to compensate for this late timing by signaling these control transistors earlier. However the turn on and turn off delays are different by a factor of about 2:1. A well-known technique to increase the turn-on delay of a MOS power switch is to reduce the gate drive current during turn on. This is accomplished in a known way by increasing the value of the gate resistors R1 and R2 shown in FIG. 1. To prevent the resistors from undesirably slowing the turn-off of the MOS switches, a high conductance diode is placed in parallel with each gate resistor to rapidly discharge the MOS gate capacitance and is also a well known technique. It has been experimentally found that increasing the value of R1 and R2 to 56 ohms from the prior art value of 18 ohms and shunting these resistors with BAT-48 or SD103 diodes increases the turn on delay by about 200 nSec without significantly increasing the turn-off delay. In this way the turn-on and turn-off delays are substantially equalized at about 420 nSec. We may now calculate the needed amount to raise the commutation reference voltage to achieve near-perfect commutation:

420 nSec/55 nSec/Deg=7.64 degrees C. before zero crossing is desired.

Sin 7.64=0.133;

0.133×1068 $V_{Q1}$=142 volts commutation reference is ideal, NOT near zero.

The above example describes operation at the 90 degree C. peaks of the power line frequency at an input voltage of 340. At 30 and 150 power line degrees the inverter must function on 170 volts. (Sin 30=Sin 150=0.5; 340×0.5=170). Repeating the mathematical procedure above where VQ1 peak=534 Volts=3.14×170 Volts above will show that the needed 7.64 degrees before zero crossing corresponds to ½ the above commutation reference, or 71 volts. At ¼ the instantaneous power line voltage ¼ the commutation reference voltage or 35.5 V is needed; at ¾ powerline volts ¾ the commutation reference voltage or 106.5 V is needed and so forth.

For ideal commutation, as shown in FIG. 1, a commutation circuit (defined within a dashed box) is inserted so that the commutation reference voltage must be not fixed or "near zero" but must rise in direct proportion to the instant AC power line voltage. In the present invention the proportional commutation reference voltage is provided by way of a simple dropping resistor Rcom shown in FIG. 1B as well. ZDcom limits Vcom to safe values for Q3 and Q4 which are 150 volt rated type 2N5401. Ccom serves the usual purpose of providing a high frequency bypass to stabilize the Vcom commutation reference voltage against fluctuations in the microsecond range. Its value must present a high enough reactance that minimal phase shift or waveform distortion to the 120 or 100 Hz Haversine occurs. Suitable values range from 5 to 50 nF.

Figure 2:
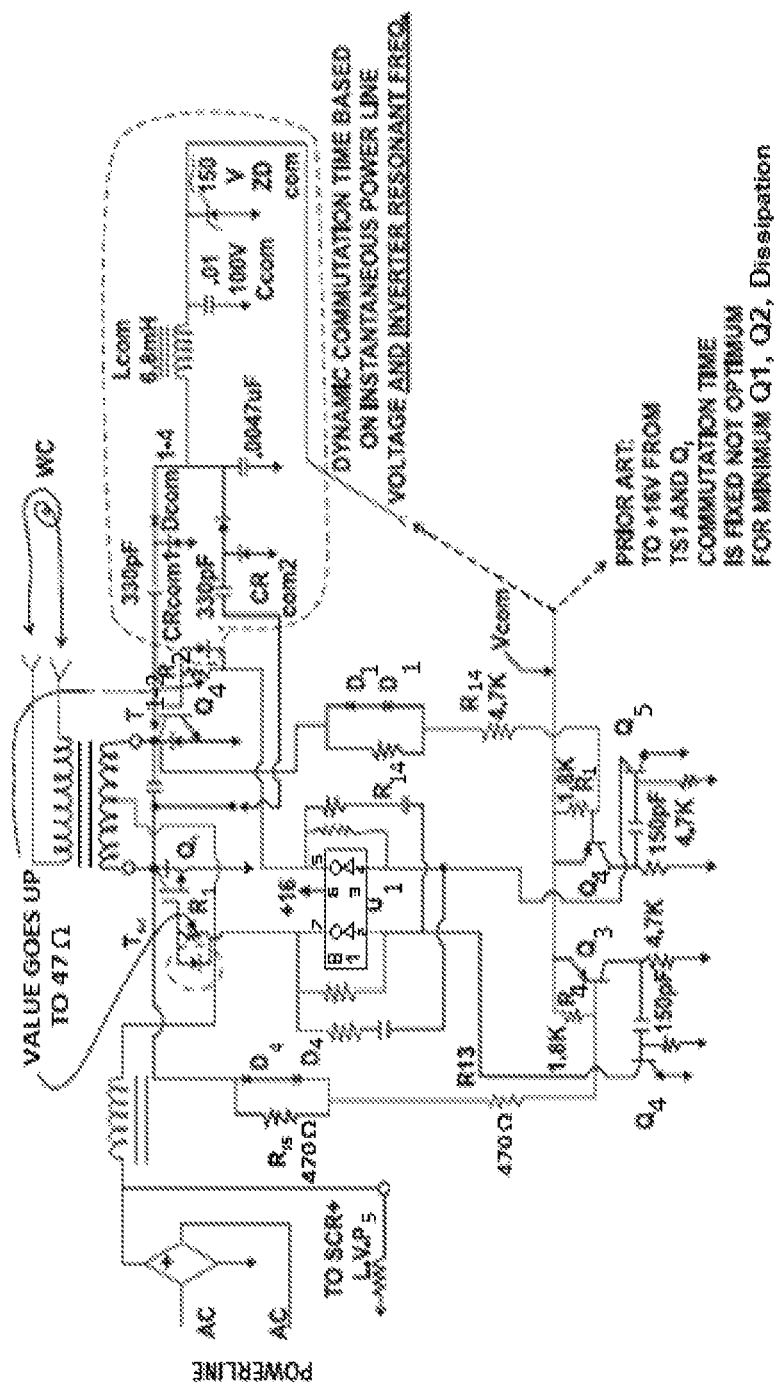
FIG. 2 is a schematic representation of another embodiment of the parallel resonant inverter of the present disclosure.
Figure 2B:
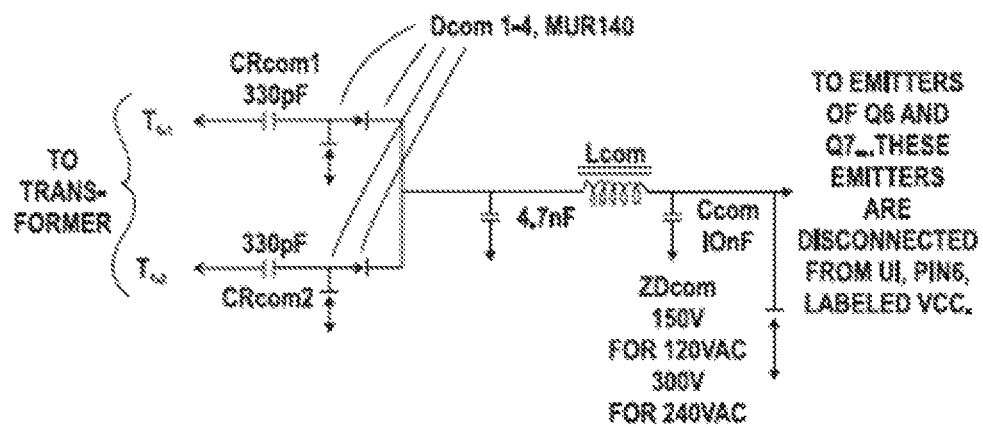
FIG. 2B is a schematic representation of another embodiment of the commutation subcircuit of the present disclosure.

In an alternate embodiment of the present invention, shown in FIG. 2 with its commutation circuit (defined within a dashed box) and best illustrated in FIG. 2B, the dissipation in the dropping resistor Rcom may be avoided. The resistance of Rcom is replaced by the capacitive reactance of CRcom 1 and Ccom 2. The high frequency voltage from transformer terminals T1-1 and T1-2 rises in direct proportion to the low frequency AC instant line voltage because the high frequency voltage at these terminals rises in direct proportion to the instant line AC voltage and Haversine DC inverter supply voltage. Therefore the current through reactance capacitors CR1 and CR2 also rise in proportion by Ohms law, and proportional to instantaneous line voltage, thus providing the desired dynamically varying commutation reference voltage.

Another advantage arises from this alternate embodiment; the commutation reference voltage rises not only with power line voltage but with inverter operating frequency as well. Depending upon the selected work coil and metallic object to be heated, the operating frequency as resonantly controlled may range from under 20 to over 100 KHz. As operating frequency rises, the capacitive reactance of CR1 and CR2 drop by: $Xc=1/2PiFC$; this results in a higher commutation reference current (at a given power line instantaneous voltage) as inverter operating frequency rises, providing a higher commutation reference voltage. Consider inverter operation at 100 KHz, twice that previously exemplified:

At 100 KHz vs the previous 50 KHz example, the period is only 10 uSec vs 20 Usec. Yet the delay times to turn on or off Q1 or Q2 remain at about 420 nSec. To achieve this same time lead, twice the number of degrees of lead are required; 15.28 degrees. To achieve this lead nearly twice the commutation reference voltage is required. 420 nSec/27.5 nSec/Deg=15.28 Degrees.

Sin 15.28=0.263;

0.263×1068=281.5=Commutation reference Voltage (ideal) for the 340 volt instantaneous example but at 100 KHz. Again, this value is far from near-zero as the previous art has stated.

Experimental Data

An induction heater using the improved transformer disclosed in US20170238374A was built and tested, both with and without the dissipation reducing commutation improvements in the present invention: The primary of the transformer consisted of 2×13 turns of 150 strand #36 AWG Litz wire. The secondary consisted of 5 turns of 840×#36 AWG Litz wire. The input power ranged from 1680 to 1750 watts as the load and work coil heated. The load consisted of a 3 inch long piece of 1.5 inch steel water pipe cooled in a bucket of water. The work coil consisted of 3 turns of #10 AWG solid wire insulated with fiberglass sleeving and was wrapped tightly around the water immersed pipe. The AC line voltage was maintained at 240 VAC 60 Hz by way of an adjustable autotransformer. The IGBT heat sink contained a type K thermocouple to measure temperature rise. Starting heat sink temperature was 30 degrees C. in all tests. Operating frequency was about 75 KHz. The results were as follows:

Prior art: Heat sink temperature rose from 30 degrees C. to 97 degrees C. in 2 minutes 5 seconds at which time the test self-terminated due to Q2 failure.

Present Invention: Heat sink temperature rose to 98 degrees C. in 5 minutes 22 seconds. At 7 minutes 30 seconds the heat sink temperature was 113 degrees C. at which point the test was terminated. Based on these tests the dissipation in the IGBTs in the present invention was about 40% of the dissipation measured in the prior art circuit.

As described above the instant invention provides a number of advantages, some of which have been described above and others of which are inherent in the invention. Also modifications may be proposed without departing from the teachings herein. Accordingly the scope of the invention is only to be limited as necessitated by the accompanying claims.

The invention claimed is:

1. A hand held induction air cooled induction heater used for heating of metallic mechanical or decorative objects to facilitate their removal or installation containing a high frequency inverter operating in voltage or current resonant mode, including power semiconductor switching device(s) having turn-on or turn-off delay time, circuitry to control the timing of on and off periods of said switching device(s), said circuitry having delay time, wherein the threshold voltage or current reference to initiate commutation or timing is not zero, and is dynamically varied in response to the instantaneous input inverter supply voltage and/or inverter frequency to achieve switching device(s) heating or dissipation reduction resulting from delaying commutation timing of said power switching devices.

2. An induction heating tool as in claim 1 in which a parallel resonant circuit or its equivalent is contained within the inverter, and a dynamically changing non-zero commutation timing reference voltage or current is employed.

3. An induction heating tool as in claim 1 in which a series resonant circuit or its equivalent is contained within the inverter, and a dynamically changing non-zero commutation timing reference current or voltage is employed.

4. A handheld induction heating tool as in claim 1 wherein heating power is generated in a hand-held size tool than has heretofor been possible without overheating the power semiconductor switching devices.

5. A hand held induction heating tool as in claim 1 wherein heating time of at least 4 minutes is available in a hand-held size tool than has heretofor been possible without overheating the power semiconductor switching devices.

6. An induction heater according to claim 1 in which the turn on and turn off times of the power semiconductor switches have substantially equal turn on and turn off times.

7. An induction heater according to claim 1 in which the turn on and turn off times of the power semiconductor switches have substantially unequal turn on and turn off times.

8. An induction heater according to claim 1 in which the intrinsic turn on and turn off times of the MOS power semiconductor switches are substantially unequal, and gate current during the turn-on interval is reduced so that the total turn on interval or time is increased and thereby made substantially equal to the intrinsic turn off interval of the MOS switch.

9. An induction heater according to claim 1 in which the dynamically varied commutation voltage or current is supplied by a dropping resistor connected between a low frequency haversine inverter power source and the commutation timing detector circuitry.

10. An induction heater according to claim 1 in which the dynamically varied commutation voltage or current is supplied by rectification of a high frequency signal from an inductive device within the inverter.

11. An induction heater according to claim 1 in which the dynamically varied commutation voltage or current is supplied by rectification of a high frequency signal from a capacitive device within the inverter.

12. An induction heater according to claim 1 in which the dynamically varied commutation voltage or current is supplied by rectification of a high frequency signal from a semiconductor device within the inverter.

* * * * *